US005668095A

United States Patent [19]

Surutzidis et al.

[11] Patent Number: 5,668,095
[45] Date of Patent: Sep. 16, 1997

[54] DETERGENT COMPOSITION WITH SUDS SUPPRESSING SYSTEM

[75] Inventors: Athanasios Surutzidis, Wemmel; Andrew Albon Fisk, Strombeek-Bever, both of Belgium

[73] Assignee: The Procter & Gamble Company, Cincinnati, Ohio

[21] Appl. No.: 411,700

[22] PCT Filed: Oct. 15, 1993

[86] PCT No.: PCT/US93/09898

§ 371 Date: Jul. 13, 1995

§ 102(e) Date: Jul. 13, 1995

[87] PCT Pub. No.: WO94/10275

PCT Pub. Date: May 11, 1994

[30] Foreign Application Priority Data

Oct. 23, 1992 [EP] European Pat. Off. ............ 92870174

[51] Int. Cl.⁶ .................................. E11D 3/08; E11D 3/18
[52] U.S. Cl. .................. 510/221; 510/228; 510/337; 510/357; 252/321; 252/358
[58] Field of Search ................... 252/174.15, 321, 252/358, 544, 551, 170; 510/221, 228, 337, 357

[56] References Cited

U.S. PATENT DOCUMENTS

| 4,075,118 | 2/1978 | Gault et al. ................. | 252/135 |
| 4,092,266 | 5/1978 | Abel et al. ................. | 252/321 |
| 4,339,342 | 7/1982 | Hempel et al. .............. | 252/174.25 |
| 4,447,349 | 5/1984 | Tai ........................... | 252/174.13 |
| 4,451,387 | 5/1984 | Tai ........................... | 252/174.15 |
| 4,599,189 | 7/1986 | Wuhrmann et al. ........... | 252/174.15 |
| 4,798,679 | 1/1989 | Castro et al. ............... | 252/174.15 |
| 4,859,359 | 8/1989 | DeMatteo et al. ............ | 252/174.15 |
| 4,891,154 | 1/1990 | Tesmann et al. ............. | 252/321 |
| 5,288,431 | 2/1994 | Huber et al. ................ | 252/548 |

FOREIGN PATENT DOCUMENTS

| 0593841 | 4/1994 | European Pat. Off. . |
| 0635564 | 1/1995 | European Pat. Off. . |
| 40 21 265 A1 | 1/1992 | Germany . |
| 9410275 | 5/1994 | WIPO . |

Primary Examiner—Paul Lieberman
Assistant Examiner—Kery A. Fries
Attorney, Agent, or Firm—Ken K. Patel; Jacobus C. Rasser; Jerry J. Yetter

[57] ABSTRACT

Detergent compositions are described which comprise a suds suppressing system consisting of a mixture of a silicone oil and a 2-alkyl-alcanol, or mixtures thereof.

13 Claims, No Drawings

DETERGENT COMPOSITION WITH SUDS SUPPRESSING SYSTEM

TECHNICAL FIELD

The present invention relates to a suds suppressing system for detergent compositions.

BACKGROUND

The modern conditions of laundry washing, especially in European countries, involve important mechanical agitation in the washing machine thereby promoting the formation of suds in the washing process. It is therefore an essential aspect of modern laundry detergent compositions that they should comprise an efficient suds control system, often referred to also as suds suppressing system.

It is well known in the art that various silicone oils can provide effective suds control, and many prior art documents therefore disclose liquid detergent compositions comprising silicone oils. See for instance U.S. Pat. Nos. 4,798,679, 4,075,118 and EP 150 872.

However, silicone oils suffer a certain number of drawbacks. A major drawback is that the incorporation of silicone oils in liquid detergents may raise physical stability issues as the level of silicone oil is raised. This problem is particularly acute as detergent compositions are formulated which are more concentrated, which is currently the trend in this technical field.

Also, silicone oils are specialty chemicals which are quite expensive. It is therefore an object of the present invention to formulate detergent compositions which have an efficient suds suppressing system, wherein said suds suppressing system comprises a minimal amount of silicone oil.

It has now been found that this object can be met by using a suds suppressing system which comprises a mixture of a silicone oil and a 2-alkyl-alcanol.

2-alkyl-alcanols have been described in DE 40 21 265 as suds suppressors in detergent compositions. The present invention is based on the finding that silicone oils and 2-alkyl-alcanols will act in synergy to control suds. This finding allows to formulate detergent compositions which comprise very low levels of silicone oils. In some instances, it has been found that the level of both the silicone oil and the 2-alkyl-alcanol can be reduced by a factor three in a mixed suds control system according to the present invention, compared to the level needed to achieve the same suds control with either ingredient alone.

SUMMARY OF THE INVENTION

The present invention is a detergent composition comprising a surfactant system and a suds suppressing system, characterized in that said suds suppressing system comprises from 0.06% to 12% of a mixture of a silicone oil, or mixtures thereof, with a 2-alkyl-alcanol, or mixtures thereof.

DETAILED DESCRIPTION OF THE INVENTION

The detergent compositions according to the present invention comprise a surfactant system and a suds suppressing system. The surfactant system comprises one or more surfactants.

The detergent compositions herein comprises from 5% to 60% by weight of the total detergent composition, preferably from 20% by weight to 40% by weight of a surfactant system. Suitable surfactants for use herein include organic surface-active agent selected from nonionic, anionic, cationic and zwitterionic surface-active agents and mixtures thereof.

Suitable anionic surface-active salts are selected from the group of sulfonates and sulfates. The like anionic surfactants are well-known in the detergent art and have found wide application in commercial detergents. Preferred anionic water-soluble sulfonate or sulfate salts have in their molecular structure an alkyl radical containing from about 8 to about 22 carbon atoms. Examples of such preferred anionic surfactant salts are the reaction products obtained by sulfating $C_8$–$C_{18}$ fatty alcohols derived from e.g. tallow oil, palm oil, palm kernel oil and coconut oil; alkylbenzene sulfonates wherein the alkyl group contains from about 9 to about 15 carbon atoms; sodium alkylglyceryl ether sulfonates; ether sulfates of fatty alcohols derived from tallow and coconut oils; coconut fatty acid monoglyceride sulfates and sulfonates; and water-soluble salts of paraffin sulfonates having from about 8 to about 22 carbon atoms in the alkyl chain. Sulfonated olefin surfactants as more fully described in e.g. U.S. Pat. No. 3,332,880 can also be used. The neutralizing cation for the anionic synthetic sulfonates and/or sulfates is represented by conventional cations which are widely used in detergent technology such as sodium, potassium or alkanolammonium.

A suitable anionic synthetic surfactant component herein is represented by the water-soluble salts of an alkylbenzene sulfonic acid, preferably sodium alkylbenzene sulfonates, preferably sodium alkylbenzene sulfonates having from about 10 to 13 carbon atoms in the alkyl group. Another preferred anionic surfactant component herein is sodium alkyl sulfates having from about 10 to 15 carbon atoms in the alkyl group.

The nonionic surfactants suitable for use herein include those produced by condensing ethylene oxide with a hydrocarbon having a reactive hydrogen atom, e.g., a hydroxyl, carboxyl, or amido group, in the presence of an acidic or basic catalyst, and include compounds having the general formula $RA(CH_2CH_2O)_nH$ wherein R represents the hydrophobic moiety, A represents the group carrying the reactive hydrogen atom and n represents the average number of ethylene oxide moieties. R typically contains from about 8 to 22 carbon atoms They can also be formed by the condensation of propylene oxide with a lower molecular weight compound. n usually varies from about 2 to about 24.

A preferred class of nonionic ethoxylates is represented by the condensation product of a fatty alcohol having from 12 to 15 carbon atoms and from about 4 to 10 moles of ethylene oxide per mole or fatty alcohol. Suitable species of this class of ethoxylates include: the condensation product of $C_{12}$–$C_{15}$ oxo-alcohols and 3 to 9 moles of ethylene oxide per mole of alcohol; the condensation product or narrow cut $C_{14}$–$C_{15}$ oxo-alcohols and 3 to 9 moles of ethylene oxide per mole of fatty(oxo)alcohol; the condensation product of a narrow cut $C_{12}$–$C_{13}$ fatty(oxo)alcohol and 6,5 moles of ethylene oxide per mole of fatty alcohol; and the condensation products of a $C_{10}$–$C_{14}$ coconut fatty alcohol with a degree of ethoxylation (moles EO/mole fatty alcohol) in the range from 4 to 8. The fatty oxo alcohols while mainly linear can have, depending upon the processing conditions and raw material olefins, a certain degree of branching, particularly short chain such as methyl branching. A degree of branching in the range from 15% to 50% (weight %) is frequently found in commercial oxo alcohols.

Suitable cationic surfactants include quaternary ammonium compounds of the formula $R_1R_2R_3R_4N^+$ where $R_1, R_2$ and $R_3$ are methyl groups, and $R_4$ is a $C_{12}$–$C_{15}$ alkyl group, or where $R_1$ is an ethyl or hydroxy ethyl group, $R_2$ and $R_3$ are methyl groups and $R_4$ is a $C_{12}$–$C_{15}$ alkyl group.

Zwitterionic surfactants include derivatives of aliphatic quaternary ammonium, phosphonium, and sulfonium compounds in which the aliphatic moiety can be straight or branched chain and wherein one of the aliphatic substituents contains from about 8 to about 24 carbon atoms and another substituent contains, at least, an anionic water-solubilizing group. Particularly preferred zwitterionic materials are the ethoxylated ammonium sulfonates and sulfates disclosed in U.S. Pat. Nos. 3,925,262, Laughlin et al., issued Dec. 9, 1975 and 3,929,678, Laughlin et al., issued Dec. 30, 1975.

Semi-polar nonionic surfactants include water-soluble amine oxides containing one alkyl or hydroxy alkyl moiety of from about 8 to about 28 carbon atoms and two moieties selected from the group consisting of alkyl groups and hydroxy alkyl groups, containing from 1 to about 3 carbon atoms which can optionally be joined into ring structures.

Also suitable are Poly hydroxy fatty acid amide surfactants of the formula

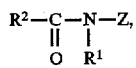

wherein $R^1$ is H, $C_{1-4}$ hydrocarbyl, 2-hydroxy ethyl, 2-hydroxy propyl or a mixture thereof, $R_2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R_1$ is methyl, $R_2$ is a straight $C_{11-15}$ alkyl or alkenyl chain or mixtures thereof, and Z is derived from a reducing sugar such as glucose, fructose, maltose, lactose, in a reductive amination reaction.

Under a given mechanical agitation, heavy sudsing seems to occur particularly when a surfactant system is used which comprises an anionic surfactant, particularly a linear alkyl benzene sulfonate, and a polyhydroxy fatty acid amide as hereinbefore described. Accordingly, the present invention finds a preferred application in such systems.

The composition according to the present invention can be formulated as a variety of different products, including laundry detergents, dishwashing products and household cleaners. Compositions according to the present invention may be granular or liquid, aqueous or anhydrous. Depending on the amount of active ingredients, compositions according to the present invention can be formulated as conventional detergent compositions or, as an alternative as so-called "concentrated" detergent compositions. Physical stability issues are more likely to occur in concentrated liquid detergents, where the total proportion of active ingredient is higher than in a non-concentrated detergent composition. Accordingly, the present invention, which allows to use a lower amount of active ingredients in order to obtain a given suds suppressing performance finds a preferred application in such concentrated detergents composition. Preferred compositions herein are concentrated aqueous liquid detergent compositions which comprise less than 30% by weight of water.

The compositions according to the present invention further comprise a suds suppressing system. The suds suppressing system, or suds control system, for use in the compositions according to the present invention comprises a mixture of a silicone oil, or mixtures thereof, and a 2-alkyl-alcanol, or mixtures thereof.

Suitable silicone oils for use herein have been extensively described in the art, for instance in U.S. Pat. Nos. 4,798,679, 4,075,118 and EP 150 872. Suitable silicone oils for use herein comprise compounds having a polysiloxane backbone, preferably substituted polysiloxane. Also suitable for use herein are silicone oils which comprise substituted polysiloxanes in mixture with hydrophobic silica and or dispersing agents. Accordingly, the term silicone oil as used herein includes mixtures of polysiloxanes with hydrophobic silica. Suitable silicone oils for use herein have a viscosity in the range of from 10 to 60000, preferably from 200 to 30000, more preferably from 500 to 12500. Particularly preferred for use herein is a silicone oil comprising a polydimethyl siloxane and hydrophobic silica, with a molecular weight in the range of from 500 to 12500. Suitable silicone oils for use herein are commercially available from various companies including Rhone Poulenc, Fueller and Dow Corning. The suds suppressing system for use herein comprises from about 0.01% to 2.00% by weight of the total composition of said silicone oil or mixture thereof, preferably from 0.05% to 1%, most preferably from 0.1% to 0.5%. Mixtures of silicone oils can be used in the compositions according to the present invention.

Suitable 2-alky-alcanols for use herein have been described in DE 40 21 265. The 2-alkyl-alcanols suitable for use herein consist of a $C_6$ to $C_{16}$ alkyl chain carrying a terminal hydroxy group, and said alkyl chain is substituted in the $\alpha$ position by a $C_1$ to $C_{10}$ alkyl chain. Preferably, the alkyl chain carrying the hydroxy group is a $C_8$ to $C_{12}$ alkyl chain, and the alkyl chain in the $\alpha$ position is a $C_2$ to $C_8$ alkyl chain, most preferably $C_3$ to $C_6$. Preferably all alkyl chains herein are straight. It has been found that 2-Butyl-octanol is particularly suitable for use herein. 2-butyl-octanol is commercially available fron Condea under the trade name ISOFOL 12®. The suds suppressing system for use herein comprises from 0.05% to 10% by weight of the total composition of said 2-alkyl-alcanols, preferably from 1% to 5%, most preferably from 2% to 4%. Mixtures of 2-alkyl-alcanols can be used in the compositions according to the present invention. Such mixtures are comprised in commercially available materials, for instance ISALCHEM 123® from Enichem.

Accordingly, the detergent compositions according to the present invention comprise from 0.06% to 12% by weight of the total composition of said suds suppressing system comprising a silicone oil or mixtures thereof and a 2-alkyl alcanol or mixtures thereof, most preferably from 1% to 5%.

The compositions according to the present invention may further comprise the following optional ingredients.

The compositions according to the present invention may comprise a builder system. Any conventional builder system is suitable for use herein including polycarboxylates and fatty acids, materials such as ethylenediamine tetraacetate, metal ion sequestrants such as aminopolyphosphonates, particularly ethylenediamine tetramethylene phosphonic acid and diethylene triamine pentamethylenephosphonic acid. Though less preferred for obvious environmental reasons, phosphate builders can also be used herein.

Suitable polycarboxylates builders for use herein include citric acid, preferably in the form of a water-soluble salt, derivatives of succinic acid of the formula R—CH(COOH) $CH_2$(COOH) wherein R is $C_{10-20}$ alkyl or alkenyl, preferably $C_{12-16}$, or wherein R can be substituted with hydroxyl, sulfo sulfoxyl or sulfone substitutents. Specific examples include lauryl succinate, myristyl succinate, palmityl succinate, 2-dodecenylsuccinate, 2-tetradecenyl succinate. Succinate builders are preferably used in the form of their water-soluble salts, including sodium, potassium, ammonium and alkanolammonium salts. Other suitable polycarboxylates are oxodisuccinates and mixtures of tartrate monosuccinic and tartrate disuccinic acid such as described in U.S. Pat. No. 4,663,071

Suitable fatty acid builders for use herein are saturated or unsaturated $C_{10-18}$ fatty acids, as well as the corresponding soaps. Preferred saturated species have from 12 to 16 carbon atoms in the alkyl chain. The preferred unsaturated fatty acid is oleic acid.

A preferred builder system for use herein consists of a mixture of citric acid, fatty acids and succinic acid derivatives described herein above. The builder system according to the present invention preferably represents from 5% to 35% by weight of the total composition.

The compositions according to the invention preferably comprise enzymes. Suitable enzymes for use herein are protease, lipases, cellulases and amylases and mixtures thereof. The compositions according to the present invention may also comprise an enzyme stabilizing system. Any conventional enzyme stabilizing system is suitable for use herein, and preferred enzyme stabilizing systems are based on boric acid or derivatives thereof, 1,2-propanediol, carboxylic acids, and mixtures thereof.

The compositions herein can contain a series of further, optional ingredients. Examples of the like additives include solvents, alkanolamines, pH adjusting agents, opacifiers, agents to improve the machine compatibility in relation to enamel-coated surfaces, perfumes, dyes, color-stabilization systems, bactericides, brighteners, soil release agents, softening agents and the like.

EXAMPLES

The compositions according to the present invention will be further illustrated by the following examples. The following compositions are made by mixing the listed ingredients in the listed proportions (weight %).

|  | I | II | III | IV |
| --- | --- | --- | --- | --- |
| $C_{12}$–$C_{15}$ Alkyl sulfate | — | 19.0 | 21.0 | — |
| $C_{12}$–$C_{15}$ Alkyl ethoxylated sulfate | 23.0 | 4.0 | 4.0 | 25.0 |
| $C_{12}$–$C_{14}$ N-methyl glucamide | 9.0 | 9.0 | 9.0 | 9.0 |
| $C_{12}$–$C_{14}$ fatty alcohol ethoxylate | 6.0 | 6.0 | 6.0 | 6.0 |
| $C_{12}$–$C_{16}$ Fatty acid | 9.0 | 6.8 | 14.0 | 14.0 |
| citric acid anhydrous | 6.0 | 4.5 | 3.5 | 3.5 |
| Diethylene triamine penta methylene phosphonic acid | 1.0 | 1.0 | 2.0 | 2.0 |
| Monoethanolamine | 13.2 | 12.7 | 12.8 | 11.0 |
| Propanediol | 12.7 | 14.5 | 13.1 | 10.0 |
| Ethanol | 1.8 | 1.8 | 4.7 | 5.4 |
| Enzymes | 2.4 | 2.4 | 2.0 | 2.0 |
| Soil release polymer | 0.5 | 0.5 | 0.5 | 0.5 |
| Polyvinyl pyrrolidone | 1.0 | 1.0 | — | — |
| Boric acid | 2.4 | 2.4 | 2.8 | 2.8 |
| 2-butyl-Octanol | 2.0 | 2.0 | 2.0 | 2.0 |
| DC 3421 R (1) | 0.3 | 0.4 | 0.3 | 0.4 |
| FF 400 R (2) |  |  |  |  |
| Water & Minors | up to 100% | | | |

(1) DC 3421 is a silicone oil commercially available from Dow Corning.
(2) is a silicone glycol emulsifier available from Dow Corning.

All four compositions were physically stable upon storage. Compositions I and II were tested in washing conditions at 100 mls per wash and compositions III and IV at 75 mls per wash. No oversudsing was observed with any of the compositions.

In the compositions above, a suds control system consisting of only silicone oil required about 1.3% of silicone oil for an efficient control of sudsing (0.3% to 0.4% in the system of the invention). Similarly, a suds suppressing system consisting only of 2-alky-alcanol required about 6% of said 2-alkyl alcanol (2.0% in the system of the invention).

What is claimed is:

1. A detergent composition comprising (a) from 5% to 60% by weight of the total composition surfactant and (b) from 0.06% to 5% by weight of the total composition of a suds suppressing system comprising at least one silicone oil and at least one 2-alkyl-alcanol wherein said 2-alkyl-alcanol is present in an amount of 0.05% to 4% by weight of the total composition.

2. A composition according to claim 1 which comprises from 0.01% to 2% by weight of the total composition of said silicone oil.

3. A composition according to claim 1 which comprises from 20% to 40% by weight of said surfactant system.

4. A composition according to claim 1 wherein said surfactant comprises a mixture of a linear benzene alkyl sulfonate and a polyhydroxy fatty acid amide surfactant of the formula (I):

wherein $R^1$ is H, 2-hydroxy ethyl, 2-hydroxy propyl or a mixture thereof, $R_2$ is $C_5$–$C_{31}$ hydrocarbyl, and Z is a polyhydroxyhydrocarbyl having a linear hydrocarbon chain with at least 3 hydroxyls directly connected to the chain, or a polyhydroxy fatty acid amide surfactant of the formula (I) wherein at least one hydroxyl is replaced with an alkoxyl.

5. A composition according to claim 1 which comprises from 1% to 5% by weight of said suds suppressing system.

6. A composition according to claim 1 wherein said 2-alkyl-alcanol is 2-butyl-octanol.

7. A composition according to claim 1, which is a liquid detergent composition.

8. A composition according to claim 7, which is a concentrated aqueous liquid detergent composition comprising less than 30% by weight of the total composition of water.

9. A composition according to claim 1 which comprises 0.1% to 0.5% by weight of the total composition of the at least one silicone oil.

10. A composition according to claim 1 which is a dishwashing composition.

11. A composition according to claim 1 which is a laundry detergent.

12. A composition according to claim 1 which is a household cleaner.

13. A composition according to claim 1, further comprising at least one detergent ingredient selected from the group consisting of builders, enzymes, enzyme stabilizing systems, solvents, alkanolamines, pH adjusting agents, opacifiers, perfumes, dyes, color-stabilization systems, bactericides, brighteners, soil release agents, and softening agents.

* * * * *